United States Patent
Kutsch et al.

(10) Patent No.: US 11,004,580 B2
(45) Date of Patent: May 11, 2021

(54) EXPLOSION-PROOF ASSEMBLY FOR GUIDING THROUGH A STUD, AND METHOD FOR PRODUCING SAME

(71) Applicant: R. STAHL Schaltgeräte GmbH, Waldenburg (DE)

(72) Inventors: Maxim Kutsch, Heilbronn (DE); Fabian Roll, Untermuenkheim (DE)

(73) Assignee: R. Stahl Schaltgeräte GmbH, Waldenburg (DE)

( * ) Notice: Subject to any disclaimer, the term of this patent is extended or adjusted under 35 U.S.C. 154(b) by 0 days.

(21) Appl. No.: 15/748,534

(22) PCT Filed: Jul. 5, 2016

(86) PCT No.: PCT/EP2016/065818
§ 371 (c)(1),
(2) Date: Jan. 29, 2018

(87) PCT Pub. No.: WO2017/016818
PCT Pub. Date: Feb. 2, 2017

(65) Prior Publication Data
US 2018/0226179 A1  Aug. 9, 2018

(30) Foreign Application Priority Data

Jul. 28, 2015  (DE) .......................... 102015112286.3

(51) Int. Cl.
*H01B 17/58* (2006.01)
*H02G 3/22* (2006.01)
(Continued)

(52) U.S. Cl.
CPC ........... *H01B 17/583* (2013.01); *H01B 17/58* (2013.01); *H02G 3/22* (2013.01); *H01B 17/308* (2013.01); *H01R 13/527* (2013.01)

(58) Field of Classification Search
CPC .... H01B 17/58; H01B 17/583; H01B 17/308; H01R 13/527; H02G 3/22
See application file for complete search history.

(56) References Cited

U.S. PATENT DOCUMENTS 2,433,911 A * 1/1948 Johnston .............. H01B 17/308
                                                              156/281
3,761,601 A * 9/1973 Kaesser ............... H01B 17/306
                                                              174/659
(Continued)

FOREIGN PATENT DOCUMENTS

CN  101 280 868 A  10/2008
CN  101 430 962 A  5/2009
(Continued)

*Primary Examiner* — Steven T Sawyer
*Assistant Examiner* — Paresh H Paghadal
(74) *Attorney, Agent, or Firm* — Leydig, Voit & Mayer, Ltd.

(57) ABSTRACT

The invention relates to an explosion-proof assembly (22) having an electrically conductive stud (23) made of a material which is not deformable radially. The stud (23) is coaxially surrounded in a central portion (23a) by an electrically insulating, electrically insulating sleeve (30). The sleeve (30) is in turn coaxially surrounded by a connecting portion (41) of a plastically deformable connecting body (40). Plastic deformation of the connecting portion (41) reduces the outer dimension thereof and the connecting portion (41) presses inwardly against the sleeve (30) to form a frictionally engaged form-fitting connection therebetween such that the connecting body (40), the sleeve (30) and the stud (23) form a structural unit with at least one stop surface (26) on the stud (23) resting against a counter stop surface of the sleeve (30).

7 Claims, 6 Drawing Sheets (51) Int. Cl.
*H01B 17/30* (2006.01)
*H01R 13/527* (2006.01)

(56) References Cited

U.S. PATENT DOCUMENTS

| | | | | | |
|---|---|---|---|---|---|
| 5,115,563 | A | * | 5/1992 | Wilson | H01R 13/5025 |
| | | | | | 174/88 C |
| 5,174,077 | A | * | 12/1992 | Murota | F16L 5/04 |
| | | | | | 52/220.8 |
| 5,213,530 | A | * | 5/1993 | Uratsuji | H01R 13/193 |
| | | | | | 439/265 |
| 5,310,963 | A | * | 5/1994 | Kennelly | H02G 15/04 |
| | | | | | 174/650 |
| 5,347,767 | A | * | 9/1994 | Roth | A62C 2/065 |
| | | | | | 52/1 |
| 5,399,807 | A | * | 3/1995 | Yarbrough | H02G 3/22 |
| | | | | | 174/653 |
| 6,305,133 | B1 | * | 10/2001 | Cornwall | F16L 5/04 |
| | | | | | 52/1 |
| 6,359,224 | B1 | * | 3/2002 | Beele | F16L 5/10 |
| | | | | | 16/2.1 |
| 6,430,774 | B1 | * | 8/2002 | McLaughlin | B60G 11/12 |
| | | | | | 16/2.1 |
| 6,889,988 | B2 | * | 5/2005 | Cai | B60G 21/0551 |
| | | | | | 267/293 |
| 7,952,035 | B2 | * | 5/2011 | Falk | H01R 13/5216 |
| | | | | | 174/650 |
| 8,438,804 | B2 | * | 5/2013 | Nowoczin | F16L 59/16 |
| | | | | | 52/220.8 |
| 9,528,636 | B2 | * | 12/2016 | Beele | F16L 5/10 |
| 2002/0032996 | A1 | * | 3/2002 | Cornwall | F16L 5/04 |
| | | | | | 52/220.8 |
| 2009/0036588 | A1 | * | 2/2009 | Easter | C08K 3/36 |
| | | | | | 524/444 |
| 2009/0071712 | A1 | * | 3/2009 | Kim | H01H 9/042 |
| | | | | | 174/653 |
| 2009/0249581 | A1 | * | 10/2009 | Bost, Jr. | B60G 3/20 |
| | | | | | 16/2.1 |
| 2012/0292100 | A1 | * | 11/2012 | Thomas | H02G 3/22 |
| | | | | | 174/652 |
| 2013/0106060 | A1 | * | 5/2013 | Beele | F16L 5/10 |
| | | | | | 277/314 |
| 2013/0112475 | A1 | * | 5/2013 | Magno, Jr. | H02G 15/013 |
| | | | | | 174/77 R |
| 2013/0234405 | A1 | * | 9/2013 | Beele | F16L 5/10 |
| | | | | | 277/606 |
| 2015/0171606 | A1 | * | 6/2015 | Wondrak | H02G 3/088 |
| | | | | | 174/50 |
| 2015/0303675 | A1 | * | 10/2015 | Schwarz | H02G 3/0658 |
| | | | | | 174/77 R |

FOREIGN PATENT DOCUMENTS

| | | | | |
|---|---|---|---|---|
| CN | 101 725 790 | A | | 6/2010 |
| CN | 102484407 | A | | 5/2012 |
| CN | 103401343 | A | | 11/2013 |
| CN | 104 584 352 | A | | 4/2015 |
| DE | 1046171 | B | | 12/1958 |
| DE | 17 8888 2 | U | | 5/1959 |
| DE | 1788882 | U | | 5/1959 |
| WO | WO 2014/079688 | A1 | | 5/2014 |
| WO | WO-2014079688 | A1 | * | 5/2014 ........... H02G 3/0658 |

* cited by examiner

EXPLOSION-PROOF ASSEMBLY FOR GUIDING THROUGH A STUD, AND METHOD FOR PRODUCING SAME

FIELD OF THE INVENTION

The invention relates to an explosion-proof assembly and a method for producing such assembly.

BACKGROUND OF THE INVENTION

Explosion-proof assemblies are used to guide an electrical conductor from an area that is at risk of explosion, through a wall, into an explosion-proof area, wherein the ignition transmission protection in the region of the wall must be ensured by the assembly.

Various assemblies of this kind are known, DE 10 2012 111 270 A1 describes an assembly formed of a cable connection device and a multi-core cable. The cable connection device has a plastically deformable outer sleeve with a crimping portion and a hollow-cylindrical inner sleeve between the cable and the outer sleeve. The crimping portion is deformed radially inwardly, whereby the elastic inner sleeve and the cable sheathing also deform. Flamegaps outside the cable sheathing and also between the cores within the cable sheathing can thus be closed.

The guiding of studs through a wall in a flameproof manner in practice poses challenges other than those encountered when guiding conductors or cables through in a flameproof manner. Stud-type bushings are known from practice, for example the series 8171 of Stahl Schaltgeräte GmbH. There, the explosion-proof assembly comprises a stud and a sleeve-like connecting body, which are arranged coaxially relative to one another. In order to connect the stud to the connecting body and in order to provide electrical insulation between these two parts, a tubular intermediate piece is moulded in a mould from an epoxy mass and on the one hand is connected to the circumferential surface of the stud and on the other hand is connected to the inner lateral surface of the sleeve-like connecting body. In order to achieve a permanent connection, the stud and the connecting body are coated, for example with a galvanic coating and/or are provided with another or further layer. It has been found in practice that at points at which the epoxy resin mass is not sufficiently connected in an integrally bonded manner to the stud or the connecting body, micro cracks can form by post-curing of the epoxy resin, as a result of which water can infiltrate. In some cases the explosion-proof assembly does not pass the static pressure test and thus fails to meet the necessary standard.

OBJECTS AND SUMMARY OF THE INVENTION

It is an object of the present invention to provide an explosion-proof assembly for guiding through an electrically conductive stud, which can be easily produced and yet nevertheless meets the requirements of the standard.

The explosion-proof assembly includes an electrically conductive stud extending along a longitudinal axis in a longitudinal direction. The stud can preferably be made of metal or a metal alloy, for example of brass, copper or aluminium, and can be formed integrally, without seams or joints. The stud has a stud circumferential surface extending around the longitudinal axis with a plurality of circumferential surface portions. At least one of the circumferential surface portions extends at an incline or radially to the longitudinal axis and forms a first stop surface. The first stop surface for example can be an annular surface, which extends in a plane radially to the longitudinal axis, or a cone lateral surface arranged coaxially relative to the longitudinal axis. It is preferred if the stud has a plurality of first stop surfaces, which in particular have normal vectors which point away from one another.

Sleeve surface portions arranged directly adjacently in the longitudinal direction have normal vectors that point in different directions.

The assembly additionally includes an electrically insulating sleeve. The sleeve is preferably made of an elastically radially deformable material, for example an elastomer, polyamide, polytetrafluoroethylene, or another suitable plastic. An elastic material of the sleeve is understood here to mean a material that deforms elastically under the occurring deformation forces. By contrast, the stud is non-deformable under the occurring deformation forces and therefore can be referred to as a rigid stud.

The sleeve has a sleeve inner surface extending annularly in a closed manner about the longitudinal axis. The sleeve inner surface rests against the stud circumferential surface. The sleeve inner surface has a plurality of inner surface portions, at least one of which extends at an incline or radially to the longitudinal axis and forms a counter stop surface. The at least one counter stop surface is embodied as a counterpart to the stop surface and can therefore likewise be embodied as an annular surface or cone lateral surface. The at least one first stop surface and the associated at least one first counter stop surface rest against one another. A plurality of pairs formed in each case as a first stop surface and an associated first counter stop surface can also be provided.

Inner surface portions arranged directly adjacently in the longitudinal direction have normal vectors that point in different directions.

The explosion-proof assembly additionally has a connecting body, which is made of a plastically deformable material. The connecting body is preferably made of a metal or a metal alloy and in one exemplary embodiment is made of steel. The connecting body has a connecting portion which surrounds at least one length portion of the sleeve. The connecting portion is plastically deformed and presses radially inwardly against the sleeve as a result of this deformation. Due to the plastic deformation of the connecting portion, a frictionally engaged connection is formed between the connecting body and the sleeve on the one hand and between the sleeve and the stud on the other hand. An assembly of the stud free from flamegaps is thus achieved by means of the sleeve and the connecting body.

The sleeve is clamped or pinched flat between the connecting portion and the radially unyielding stud by means of the radial force resulting from the plastic deformation of the connecting portion. Here, a material flow of the material of the sleeve can take place, and the gaps provided can close or reduce in size in such a way that the prevention of ignition transmission is ensured. With this frictionally engaged clamping of the sleeve between the connecting portion and the stud, the outer diameter of the connecting portion is reduced at most by 15% and preferably at most by 10% on account of the plastic deformation thereof.

One or more counter stop surfaces can be produced by the plastic deformation of the surrounding connecting body.

An integrally bonded connection is preferably not provided between the sleeve and the stud and/or between the sleeve and the connecting body. It is optionally possible, in addition to the frictionally engaged pinched connection between the connecting portion and the sleeve and/or between the sleeve and the stud, to apply a thin adhesive layer, which is preferably thinner than the thickness of the sleeve and is preferably thinner than the thickness of the sleeve at least by a factor of 10 to 15.

Since the first stop surface and the first counter stop surface rest against one another, a movement of the sleeve relative to the stud is prevented at least in one direction along the longitudinal axis. If a plurality of first stop surfaces and first counter stop surfaces are provided, the sleeve can also be secured at the stud against movement in both directions along the longitudinal axis.

It is preferred if the explosion-proof assembly comprises a bushing opening in a wall or a bushing part, which opening is delimited by a bushing inner surface. The plastically deformed portion outer surface of the connecting portion of the connecting body forms a first delimiting surface. The bushing inner surface of the bushing opening forms a second delimiting surface. A flameproof Ex gap is formed between the two delimiting surfaces. The first delimiting surface can be produced following the plastic deformation of the connecting portion, also by an additional mechanical processing, for example by cutting of a thread. The second delimiting surface can be produced by moulding of the wall or of the bushing part, or also by an additional mechanical processing, for example by drilling and/or cutting of a thread. The Ex gap can be formed, as considered along the longitudinal axis, as a flat gap by flat delimiting surfaces without protrusions or indentations. It is alternatively also possible that the Ex gap is formed as a threaded gap and a corresponding outer thread is provided on the first delimiting surface and an associated inner thread is provided on the second delimiting surface.

The at least one first counter stop surface can be provided before the plastic deformation of the connecting portion. In this embodiment the first counter stop surface is produced already at the time of production of the sleeve, before the frictionally engaged connection between the sleeve and the connecting body or the stud is established. Alternatively or additionally, at least one first counter stop surface can be formed by and during the plastic deformation of the connecting portion. For example, it is advantageous if one of the first counter stop surfaces is provided already before the plastic deformation and a further first counter stop surface is formed during and by the plastic deformation of the connecting portion. A relative movement along the longitudinal axis can thus be prevented in both directions in a simple way by means of this embodiment.

In one exemplary embodiment a first stop surface is provided on an annular step of the stud. The annular step connects two cylindrical circumferential surface portions of the stud circumferential surface to one another which have different diameters. The normal vector of the annular step can be oriented parallel or at an incline to the longitudinal axis.

The sleeve preferably has a sleeve outer surface, which rests on a passage surface of a passage passing through the connecting body in the longitudinal direction. The passage is preferably formed at least in the connecting portion of the connecting body. By means of the plastic deformation of this connecting portion, the passage surface is pressed against the sleeve outer surface radially to the longitudinal axis.

The sleeve outer surface can comprise a plurality of outer surface portions. Here, at least one of the outer surface portions can form a second stop surface extending at an incline or radially to the longitudinal axis. A plurality of second stop surfaces can also be provided. Outer surface portions arranged directly adjacently in the longitudinal direction have normal vectors pointing in different directions.

It is additionally advantageous if the passage surface has a plurality of passage surface portions. At least one of the passage surface portions can form a second counter stop surface extending at an incline or radially to the longitudinal axis, which second counter stop surface rests against the second stop surface. A plurality of pairs formed in each case of a second stop surface and an associated second counter stop surface can also be provided. A movement of the connecting body relative to the sleeve in the longitudinal direction can be prevented by the at least one second stop surface and the at least one second counter stop surface.

The at least one second stop surface and/or the at least one second counter stop surface can be formed during and by the plastic deformation of the connecting portion. Additionally or alternatively, it is also possible that at least one second stop surface and/or at least one second counter stop surface are/is provided already before the plastic deformation of the connecting portion.

It is also advantageous if the sleeve has a sleeve outer surface with an outer surface portion having a surface profiling. Additionally or alternatively, the connecting body can have a passage surface portion with a surface profiling on its passage surface delimiting the passage.

The depth of the surface profiling is small and preferably less than 1.0 mm or less than 0.5 mm. The surface profiling for example can be formed by a knurling. It is advantageous if profile indentations or profile protrusions, which extend in the longitudinal direction, are formed at least in portions by the surface profiling. As the connecting portion is deformed a form-fitting connection can thus also be established in addition to the frictionally engaged connection, which form-fitting connection prevents the connecting body from being able to rotate relative to the sleeve about the longitudinal axis.

An explosion-proof assembly as described above can be produced by a method according to the invention comprising the following steps:

The electrically conductive stud is firstly provided. It has the first stop surface. In addition, the electrically insulating sleeve and the plastically deformable connecting body are provided.

The sleeve is fitted onto the stud and the connecting body is in turn fitted onto the sleeve so that the sleeve is arranged between the connecting portion of the connecting body and the stud circumferential surface. If the sleeve already has the first counter stop surface, the sleeve and the stud are arranged relative to one another in such a way that the first stop surface and the first counter stop surface rest against one another.

Accordingly, the connecting body is fitted onto the sleeve in such a way that the second stop surface and the second counter stop surface rest against one another as long as the two second surfaces are provided already before the plastic deformation. The relative position between the connecting body and the sleeve can thus be predefined.

The connecting portion of the connecting body is then plastically deformed. In so doing, the cross-sectional area of the outer contour in the connecting portion reduces. The connecting portion presses radially inwardly against the sleeve and thus produces a frictionally engaged connection between the connecting body and the sleeve on the one hand and between the sleeve and the stud on the other hand. Here, the stud circumferential surface rests against the sleeve inner surface. If the sleeve does not have a first counter stop surface prior to the plastic deformation, the first counter stop surface is formed by the plastic deformation and rests against the first stop surface of the stud. It is also possible that the sleeve already has a first counter stop surface prior to the plastic deformation and that a further first counter stop surface is formed by the plastic deformation and rests against an accordingly associated first stop surface of the stud.

The method can be performed easily and quickly. An integrally bonded connection between the stud and the sleeve and between the sleeve and the connecting body can be provided optionally, but is not necessary. The formed structural unit consisting of stud, sleeve and connecting body preferably consists only of these three parts. Moulding processes for connecting the stud to the connecting body in an integrally bonded manner are spared.

It is preferred that the plastic deformation of the connecting portion forms a first delimiting surface at least on a portion of the surface of the connecting portion. This first delimiting surface can form a flameproof Ex gap together with a second delimiting surface delimiting a bushing opening. This gap, as considered in the longitudinal direction, can be embodied as a flat gap or as a threaded gap, as has been explained further above.

In a preferred method the plastic deformation of the connecting body or of the connecting portion is achieved by rolling the connecting body or the connecting portion between two rolling tools. Forming plates or forming rollers can be used as rolling tools. As a result of the rolling, depending on requirements, it is possible in a simple manner to form a cylindrical surface on the portion outer surface of the connecting portion coaxially to the longitudinal axis or to form an outer thread, depending on whether the Ex gap is to be embodied as a flat gap along the longitudinal axis or as a threaded gap.

Other objects and advantages of the invention will become apparent upon reading the following detailed description and upon reference to the drawings.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENTS

Figure 1:
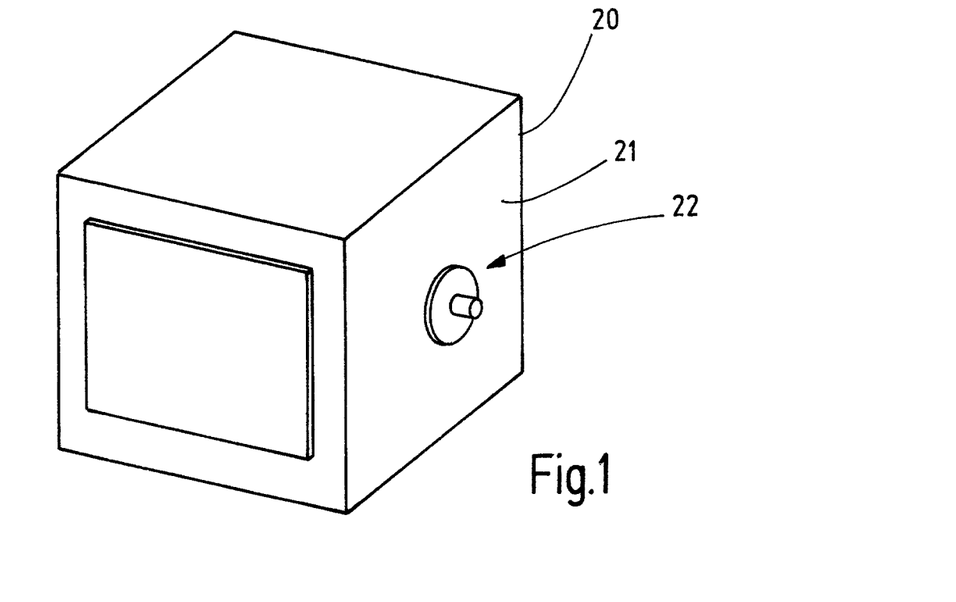
FIG. 1 is a schematic perspective of an explosion-proof housing with an explosion-proof assembly according to the invention.

Referring more particularly to FIG. 1 of the drawings, there is shown an illustrative explosion-proof housing 20 in accordance with the invention. The explosion-proof housing 20 for example can be embodied in the form of a flameproof encapsulation (Ex d). An explosion-proof assembly is provided in a wall 21 of the housing 20, by means of which assembly an electrically conductive stud 23 is guided through a bushing opening 24 in the wall 21.

The stud 23 is electrically conductive and is preferably made of metal or a metal alloy, for example of brass, copper or aluminium. The stud extends along a longitudinal axis L and is preferably rotationally symmetrical. The stud 23 is embodied as a solid body without cavities and in accordance with the example is formed in one piece, without seams or joints.

In FIG. 3-8 a first exemplary embodiment of a stud 23 of the explosion-proof assembly 22 is illustrated. The stud 23 has a stud circumferential surface 25 surrounding the longitudinal axis L in an annularly closed manner and having a plurality of circumferential surface portions. The circumferential surface portions arranged directly adjacently in a longitudinal direction R parallel to the longitudinal axis L have normal vectors which point in different directions. In the exemplary embodiment shown here at least one first circumferential surface portion 25a, a second circumferential surface portion 25b, and a third circumferential surface portion 25c are provided on a central portion 23a of the stud. As illustrated in the drawing, further circumferential surface portions can also be provided.

The first circumferential surface portion 25a and the second circumferential surface portion 25b are each formed by a cylinder lateral surface and in accordance with the example by a circular cylinder lateral surface, which are arranged coaxially to the longitudinal axis L. The diameters of the first circumferential surface portion 25a and of the second circumferential surface portion 25b are differently sized, and in accordance with the example the diameter of the second circumferential surface portion 25b is smaller. An annular step is thus formed in the transition between the first and the second circumferential surface portion 25a, 25b, on which annular step the third circumferential surface portion 25c is provided. The third circumferential surface portion 25c surrounds the longitudinal axis L annularly in a coaxial manner and can be oriented as a flat annular surface at right angles to the longitudinal axis L (FIGS. 3-5 and 8) or alternatively can extend in the form of a truncated cone lateral surface. The third circumferential surface portion 25c forms a first stop surface 26.

An end portion 23b can adjoin the central portion 23a of the stud 23 on both sides in the longitudinal direction R, whereby further circumferential surface portions can be formed.

The explosion-proof assembly 22 additionally includes a sleeve 30. The sleeve 30 in the longitudinal direction R has a length corresponding to the length of the central portion 23a of the stud 23. The sleeve 30 has a sleeve inner surface 31, which is adapted approximately to the stud circumferential surface 23 or the circumferential surface portions 25a, 25b and 25c provided in the central portion 23a. Accordingly, the sleeve inner surface 31 in the exemplary embodiment has a plurality of inner surface portions, and in accordance with the example at least three inner surface portions. The inner surface portions arranged directly adjacently in the longitudinal direction R have normal vectors which point in different directions.

In accordance with the example a first inner surface portion 31a, a second inner surface portion 31b, and a third inner surface portion 31c are provided. The first and the second inner surface portion 31a, 31b have the form of a cylinder lateral surface and in accordance with the example of a circular cylinder lateral surface, and surround the longitudinal axis L coaxially. The diameter of the first inner surface portion 31a is adapted to the diameter of the first circumferential surface portion 25a and in accordance with the example is slightly greater. Similarly hereto, the diameter of the second inner surface portion 31b is adapted to the diameter of the second circumferential surface portion 25b and in accordance with the example is slightly greater. The first and the second inner surface portion 31a, 31b are connected by the third inner surface portion 31c, which is oriented, correspondingly to the third circumferential surface portion 25c, as a circular ring surface radially to the longitudinal axis L or forms a truncated cone lateral surface. The third inner surface portion 31c forms a first counter stop surface 32, which cooperates with the first stop surface 26 of the stud 23.

The sleeve 30 has a sleeve outer surface 33 with a plurality of outer surface portions. In the exemplary embodiment described here, five outer surface portion 33a, 33b, 33c, 33d and 33e are provided. The outer surface portions arranged directly adjacently in the longitudinal direction R have normal vectors which point in different directions.

In the described exemplary embodiment according to FIGS. 3, 4 and 8-10, the first outer surface portion 33a, the second outer surface portion 33b, and the third outer surface portion 33c are each formed by cylinder lateral surfaces, and in accordance with the example circular cylinder lateral surfaces, wherein the first outer surface portion 33a has a diameter different from that of the second and the third outer surface portion 33b, 33c. The first outer surface portion 33a is arranged between the second and the third outer surface portion 33b, 33c and is connected via a fourth outer surface portion 33d to the second outer surface portion 33b or via a fifth outer surface portion 33e to the third outer surface portion 33c. In the exemplary embodiment the fourth outer surface portion 33d is arranged in a plane radially to the longitudinal axis L. The fifth outer surface portion 33e has the form of a truncated cone lateral surface. The length of the first outer surface portion 33a in the longitudinal direction R parallel to the longitudinal axis L is much greater and in accordance with the example is greater than the length of the second outer surface portion 33b and/or of the third outer surface portion 33c by a factor of at least 3 to 4. The second outer surface portion 33b surrounds the second inner surface portion 31b at least in portions and in accordance with the example is shorter in the longitudinal direction R than the second inner surface portion 31b.

The fourth outer surface portion 33d and in accordance with the example the additional fifth outer surface portion 33e each form a second stop surface 34.

The sleeve 30 is made of resiliently deformable material. This is understood to mean material that deforms elastically under the deformation forces occurring. A plastic can be used as material for the sleeve 30, and in accordance with the example elastomer, polyamide or polytetrafluoroethylene is used.

The explosion-proof assembly 22 additionally includes a connecting body 40. The connecting body 40 has a tubular or sleeve-shaped connecting portion 41. In addition to the connecting portion 41, further portions can optionally be provided. In accordance with the example, the connecting body 40 has a flange portion 42 with an annular flange 43, which protrudes beyond the connecting portion 41 radially to the longitudinal axis L.

The connecting portion 41 and in accordance with the example also the flange portion 42 have an aperture or passage 44. The aperture 44 is delimited in the circumferential direction about the longitudinal axis L by a passage surface 45, which has a plurality of passage surface portions, and in the exemplary embodiment at least three passage surface portions: a first passage surface portion 45a, a second passage surface portion 45b, and a third passage surface portion 45c connecting the first passage surface portion and the second passage surface portion 45a, 45b. The passage surface portions arranged directly adjacently in the longitudinal direction R have normal vectors which point in different directions.

The first and the second passage surface portion 45a, 45b are each formed by cylinder lateral surfaces and in accordance with the example circular cylinder lateral surfaces and surround the longitudinal axis L coaxially. The first passage surface portion 45a has a larger diameter than the second passage surface portion 45b. The third passage surface portion 45c is provided at the annular step between said first and second passage surface portion and is arranged as a circular ring surface in a plane radially to the longitudinal axis L. Alternatively, the third passage surface portion 45c could also be embodied as a truncated cone lateral surface. It is adapted in particular to the fourth outer surface portion 33d or the second stop surface 34 formed thereby. The third passage surface portion 45c forms a second counter stop surface 46.

The inner diameter of the first passage surface portion 45a is adapted to the outer diameter of the first outer surface portion 33a and in accordance with the example is slightly greater. Accordingly, the inner diameter of the second passage surface portion 45b is adapted to the outer diameter of the second outer surface portion 33b and in accordance with the example is slightly larger. The length in the longitudinal direction R of the first passage surface portion 45a corresponds to the total length in the longitudinal direction R of the first outer surface portion 33a, of the third outer surface portion 33c, and of the fifth outer surface portion 33e. The length of the second passage surface portion 45b in the longitudinal direction R corresponds to the length of the second outer surface portion 33b. In the exemplary embodiment the total length in the longitudinal direction R of the connecting body 40 is exactly the same size as the total length of the sleeve 30.

The thickness of the connecting portion 41 is enlarged at a reinforced region 41a of the connecting portion 41 of the connecting body 40 arranged coaxially relative to the third outer surface portion 33c and the fifth outer surface portion 33e of the sleeve 30. In addition, the connecting portion 41 in the exemplary embodiment has a hollow-cylindrical starting form prior to the plastic deformation of the connecting portion 41. The enlargement of the thickness at the reinforced region 41a of the connecting portion 41—in accordance with the example at an axial end on the axial side opposite the annular flange 43—can correspond to the difference between the radii of the first outer surface portion 33a and the third outer surface portion 33c.

FIG. 3-8 illustrate the step-by-step assembly or production of the explosion-proof assembly 22.

The sleeve 30 is firstly fitted onto the stud 23 in the radial direction R, so that the first inner surface portion 31a of the sleeve 30 surrounds the first circumferential surface portion 23a of the stud and the second inner surface portion 31b of the sleeve 30 surrounds the second circumferential surface portion 23b of the stud 23. Here, the first counter stop surface 32 of the sleeve comes into abutment with the stop surface 26 on the stud 23. An axial position of the sleeve 30 relative to the stud 23 is thus defined.

In addition, the connecting body 40 is fitted via its end opposite the annular flange 43 onto the sleeve 30, so that the first passage surface portion 45a surrounds the first outer surface portion 33a, the third outer surface portion 33c and the fifth outer surface portion 33e of the sleeve 30. The second passage surface portion 45b surrounds the second outer surface portion 33b of the sleeve 30. The second counter stop surface 46 formed on the inner side of the connecting body 40 comes into abutment with the second stop surface 34 on the circumferential side of the sleeve 30. The axial relative position in the longitudinal direction R between the sleeve 30 and the connecting body 40 is thus also defined. This situation is illustrated in FIG. 5.

Figure 5:
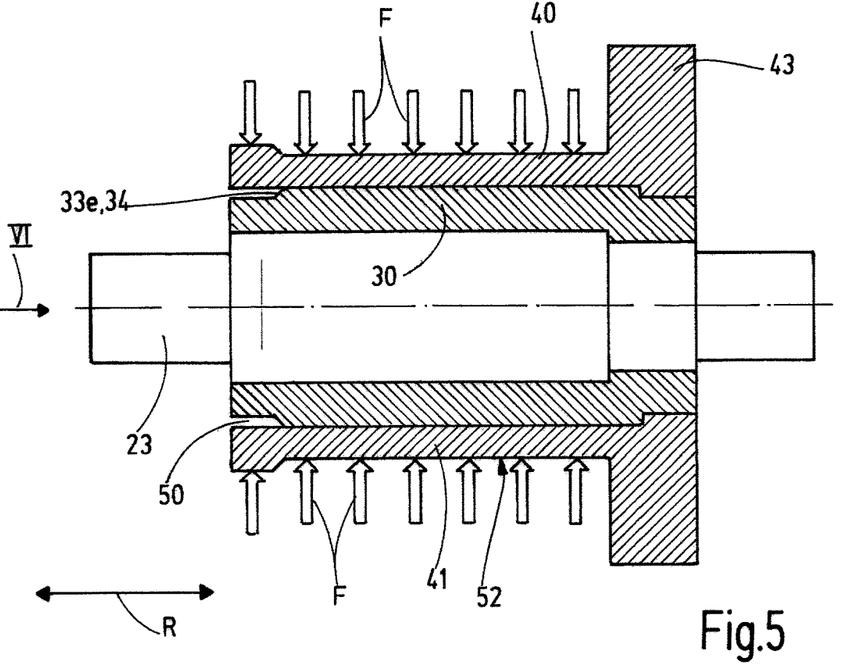
FIG. 5 is a longitudinal section of the assembled stud, sleeve, and connecting body shown in FIG. 4 in an assembled state prior to a plastic deformation of a connecting portion of the connecting body.
Figure 6:
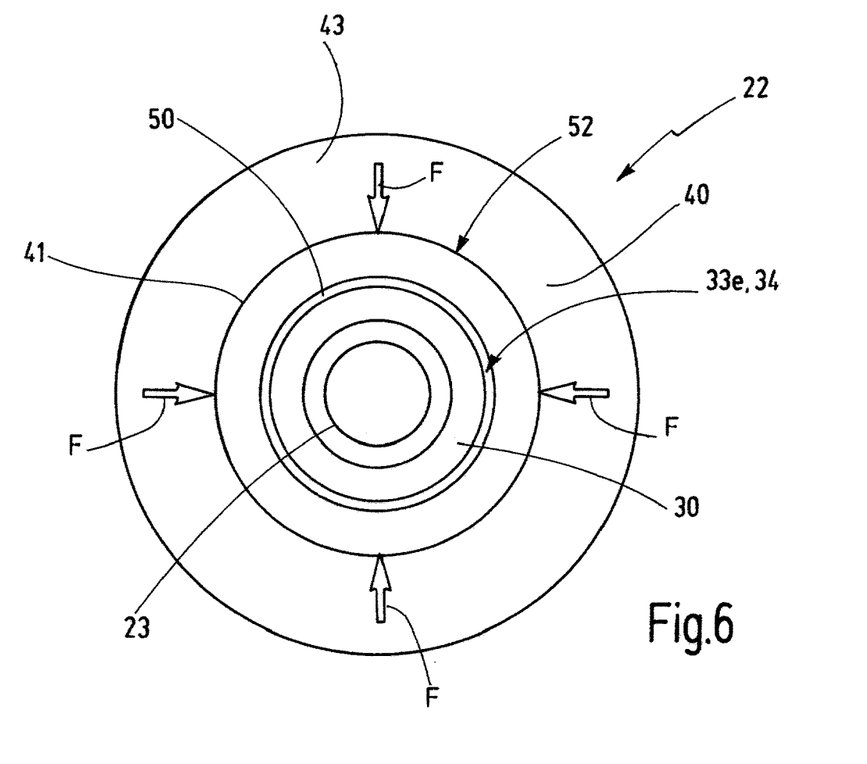
FIG. 6 is an end view of the explosion-proof assembly shown in FIG. 5.

FIGS. 5 and 6 schematically depicts, by block arrows, the fact that a mechanical deformation force F is exerted onto the connecting portion 41 from outside in order to plastically deform the connecting portion 41. Here, the outer dimension of the connecting portion 41 decreases, and said connecting portion is pressed radially inwardly against the sleeve 30, which in turn is supported on the central portion 23a of the stud 23. As a result of this plastic deformation with the aid of the deformation force F, a frictionally engaged connection is created between the connecting body 40, the sleeve 30 and the stud 23.

In addition to this frictionally engaged connection, a form-fitting connection can also be created between two of the three parts (connecting body 40, sleeve 30, stud 23) by means of the plastic deformation. It can be seen in FIG. 5 that a circumferential gap or annular gap 50 exists between the sleeve 30 and more precisely the third outer surface portion 33c and the first passage surface portion 45a prior to the plastic deformation of the connecting portion 41. Due to the plastic deformation, the region 41a of the connecting portion 41 that is reinforced in accordance with the example is pressed radially inwardly until the circumferential gap or annular gap 50 is closed. This results in a second counter stop surface 46 on the connecting portion 41 of the connecting body 40, which second counter stop surface presses against the second stop surface 34, which is formed by the fifth outer surface portion 33e of the sleeve 30.

It is thus provided that a further second counter stop surface 46 is produced by the plastic deformation of the connecting portion 41, whereas another second counter stop surface 46 is provided already prior to the plastic deformation and in accordance with the example is formed by the third passage surface portion 45c.

Figure 7:
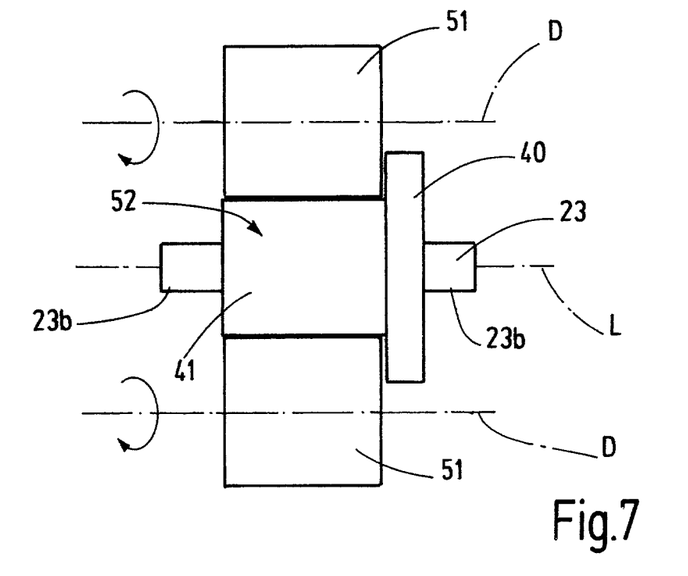
FIG. 7 is a depiction of the plastic deformation of the connecting portion of the connecting body.

The plastic deformation of the connecting portion 41 of the connecting body 40—as illustrated schematically in FIG. 7—can be performed by rolling the connecting portion 41 between two rolling tools 51. Rollers which rotate about respective axes of rotation D are illustrated by way of example as roller tools 51 in FIG. 7. The axes of rotation D are arranged here parallel to the longitudinal axis L. The degree of deformation of the connecting portion 41 can be predefined by the distance between the two axes of rotation D. Alternatively to the use of rollers, the connecting portion 41 could also be rolled between two planar roller tools, the distance between which predefines the degree of deformation and which move relative to one another in a parallel orientation, so that the connecting portion 41 is rolled between the planar rolling tools.

Figure 8:
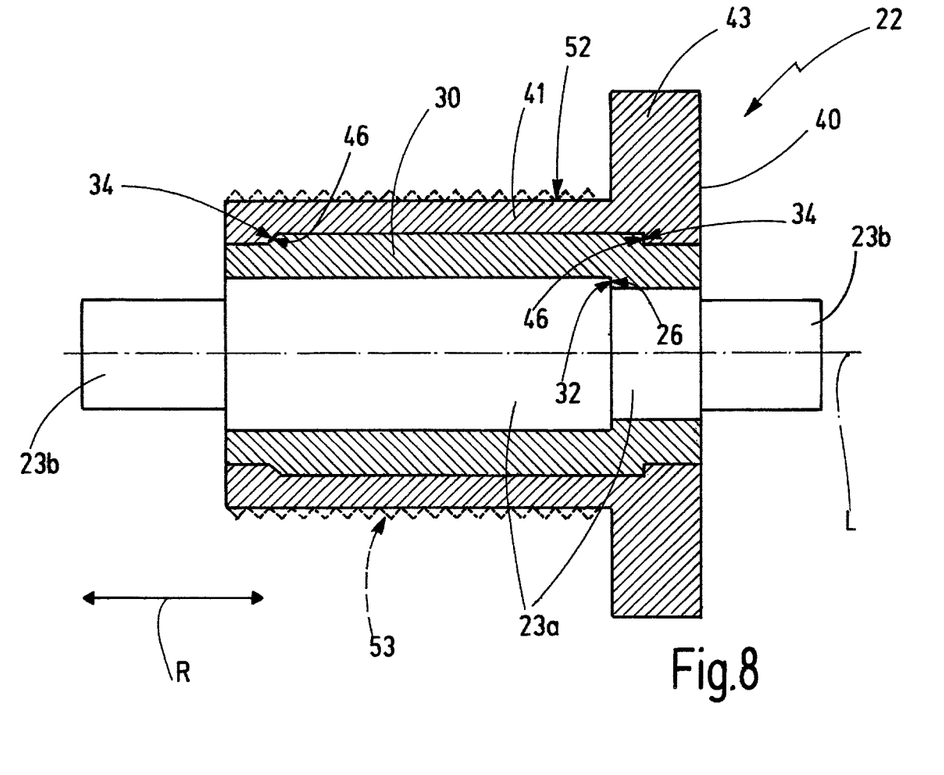
FIG. 8 is a longitudinal section of the explosion-proof assembly according to FIG. 4-6 after plastic deformation of the connecting portion of the connecting body.

FIG. 8 schematically illustrates the explosion-proof arrangement 22 following the plastic deformation of the connecting portion 41. The stud 23, the sleeve 30, and the connecting body 40 are connected to one another in a flameproof and frictionally engaged manner and at least partially also in a form-fitting manner.

A plastically deformed portion outer surface 52 of the connecting portion 41 can be embodied by a cylinder lateral surface without protrusions or indentations and as a flat surface so to speak. Alternatively, it is also possible to introduce a surface profiling by means of the roller tools 51 or—as illustrated schematically and in a dashed manner in FIG. 8—to form an outer thread 53.

Figure 2:
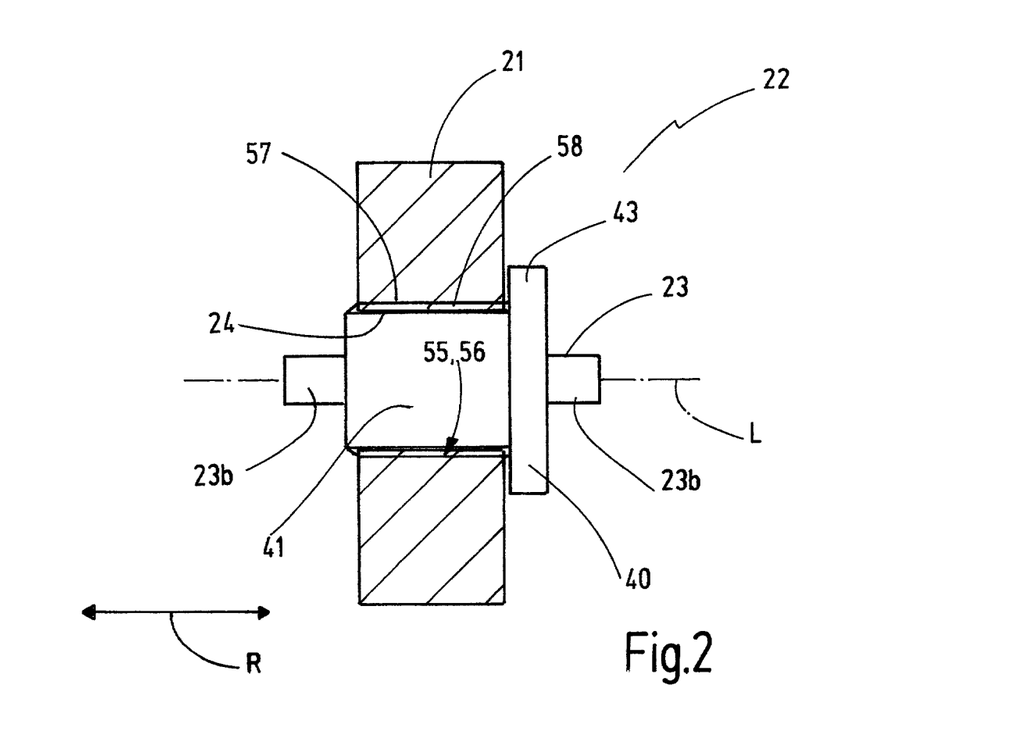
FIG. 2 is an enlarged side view of the explosion-proof assembly shown in FIG. 1 in a wall of the housing.
Figure 3:
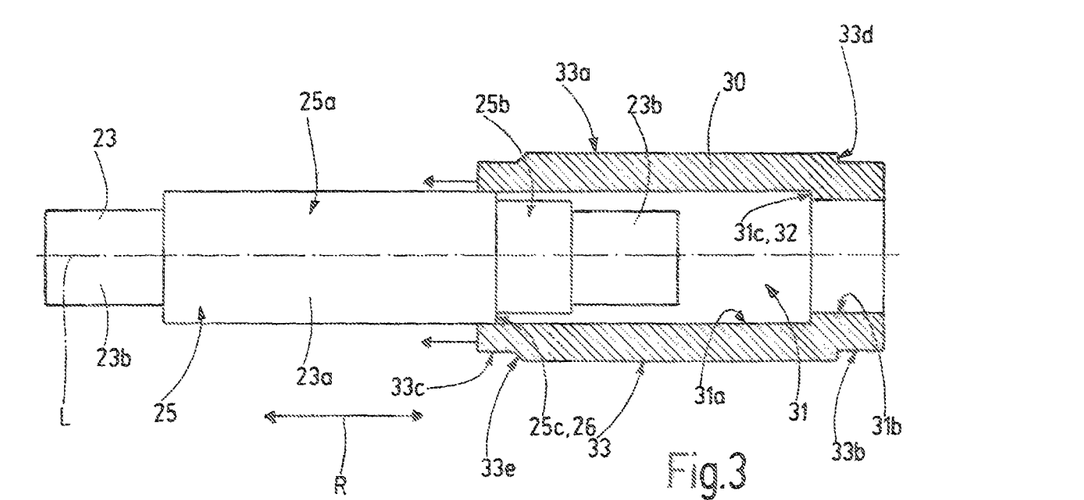
FIG. 3 is a longitudinal section of a stud and sleeve of an exemplary embodiment of an explosion-proof assembly.
Figure 4:
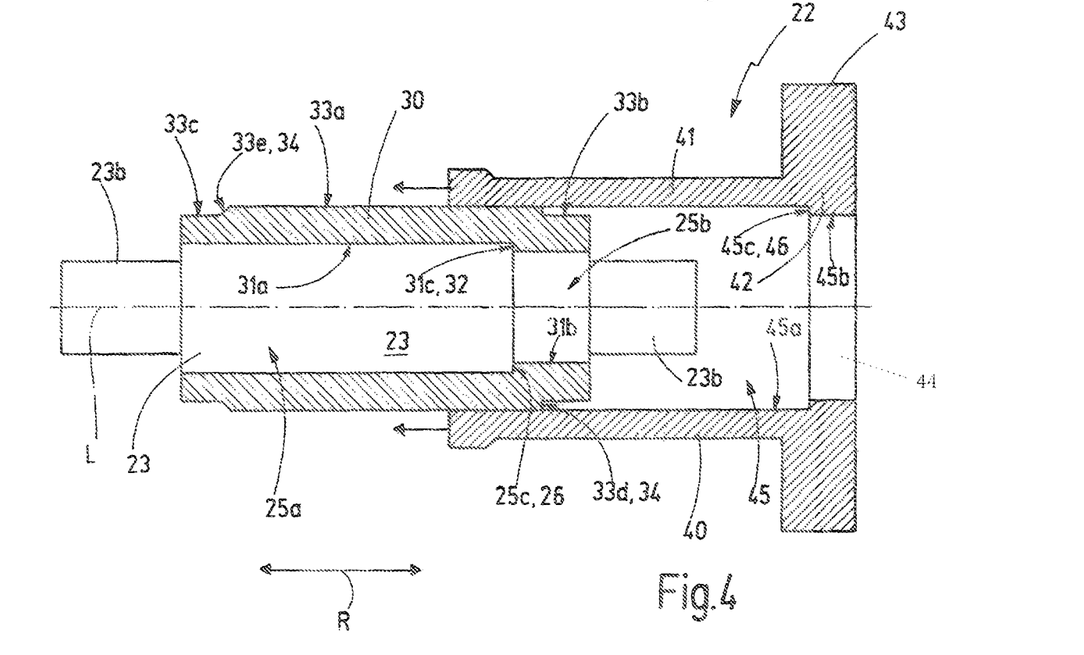
FIG. 4 is a longitudinal section of the stud and the sleeve shown in FIG. 1 being inserted into a connecting body of an exemplary explosion-proof assembly.

The plastically deformed outer portion surface 52 of the connecting portion 41 constitutes a first delimiting surface 54. The structural unit formed of the connecting body 40, the sleeve 30 and the stud 23 is arranged in the bushing opening 24. The bushing inner surface 55 delimiting the bushing opening 24 in the circumferential direction about the longitudinal axis L forms a second delimiting surface 56. An inner thread 57 can be formed on the second delimiting surface 56 (FIG. 2). The first delimiting surface 54 on the connecting body 40 and the second delimiting surface 56 in the bushing opening 24 together form a flameproof Ex gap 58.

As depicted schematically in FIG. 2, the Ex gap 58 can be formed by a threaded gap, if an outer thread 53 is provided on the first delimiting surface 54 and an inner thread 57 is provided on the second delimiting surface 56. The two delimiting surfaces 54, 56 can also be embodied as cylinder lateral surfaces, so that the Ex gap 58 is formed by an annular gap between the two delimiting surfaces.

Figure 11:
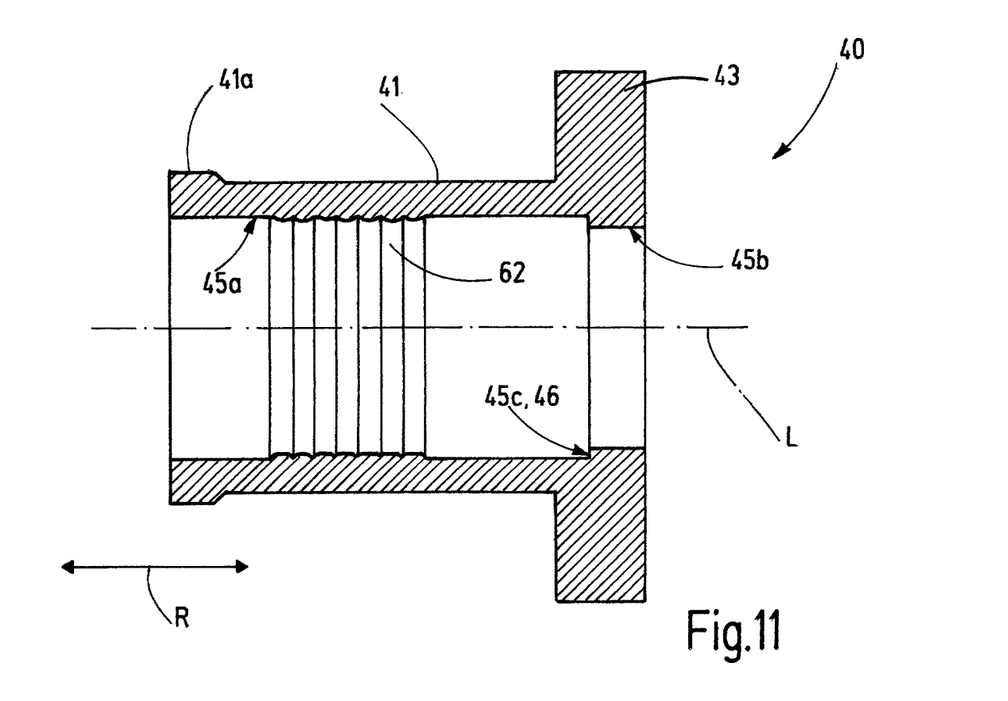
FIG. 11 is a longitudinal section of a further exemplary embodiment of a connecting body for use in the explosion-proof assembly.
Figure 12:
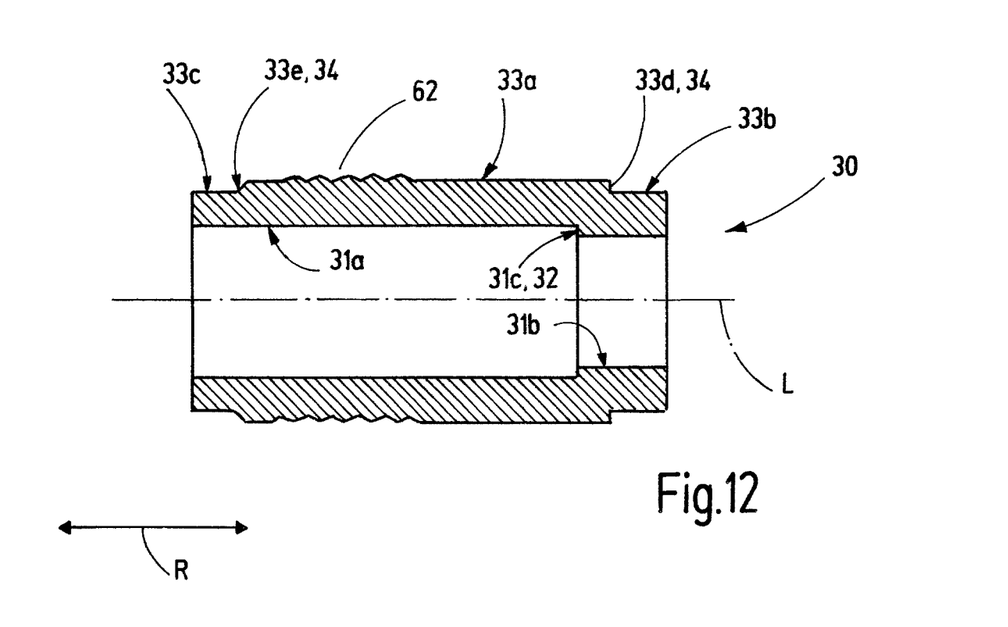
FIG. 12 is a longitudinal section of a further exemplary embodiment of a sleeve for use in the explosion-proof assembly.

FIGS. 11 and 12 illustrate a modified exemplary embodiment for the connecting body 40 and the sleeve 30. A surface profiling 62 can be formed on an outer surface portion and in accordance with the example on the first outer surface portion 33a. Additionally or alternatively, it is also possible to form a surface profiling 62 in a passage surface portion and in accordance with the example the first passage surface portion 45a. It should be noted that the surface profilings 62 depicted in FIGS. 11 and 12 have not been depicted true to scale and merely for the sake of clarity have been depicted in an enlarged manner compared to the stop surfaces and counter stop surfaces. The surface profiling 62 is preferably formed by a knurling or the like. Its depth is at most 1.0 mm and preferably less than 0.5 mm. The surface profiling 62 can have any form and for example can be formed by pimple-like and/or spiked protrusions and/or indentations.

At the time of plastic deformation of the connecting portion 41, a form-fitting engagement between the sleeve 30 and the connecting body 40 can also be achieved by a surface profiling 62 in addition to the resultant frictionally engaged connection. Depending on the form of the profiling, it is also possible to produce a form-fitting anti-twist means, which prevents a relative rotation between the connecting body 40 and the sleeve 30 under the forces usually occurring. To this end, indentations running parallel to the longitudinal axis L or at least at an incline to the circumferential direction about the longitudinal axis L could be provided, for example. Similarly to a knurling, indentations of this kind can also be formed in intersecting directions.

Figure 9:
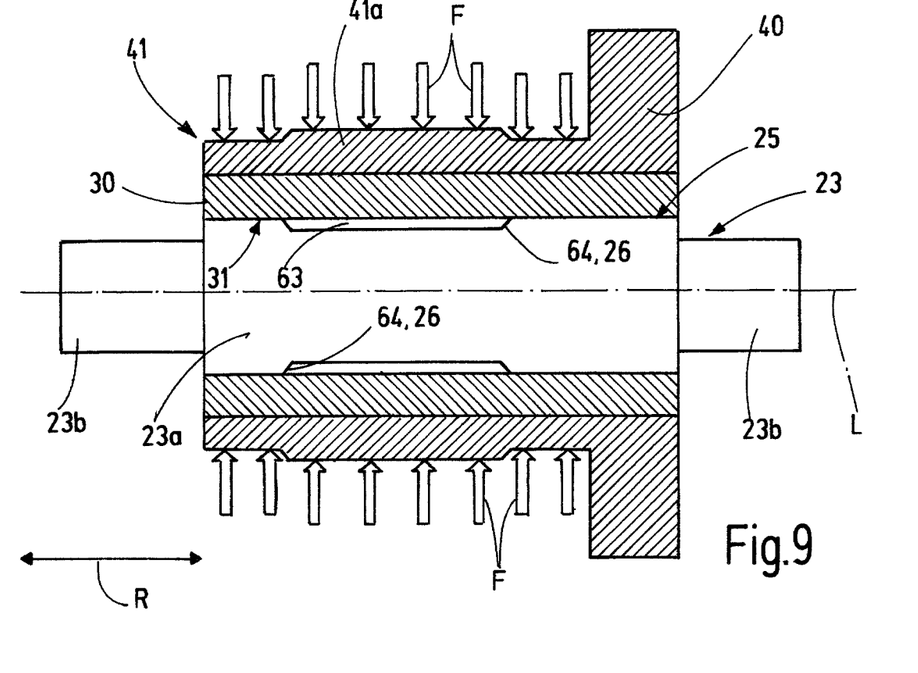
FIG. 9 is a longitudinal section of a further exemplary embodiment of an explosion-proof assembly prior to plastic deformation of the connecting portion.
Figure 10:
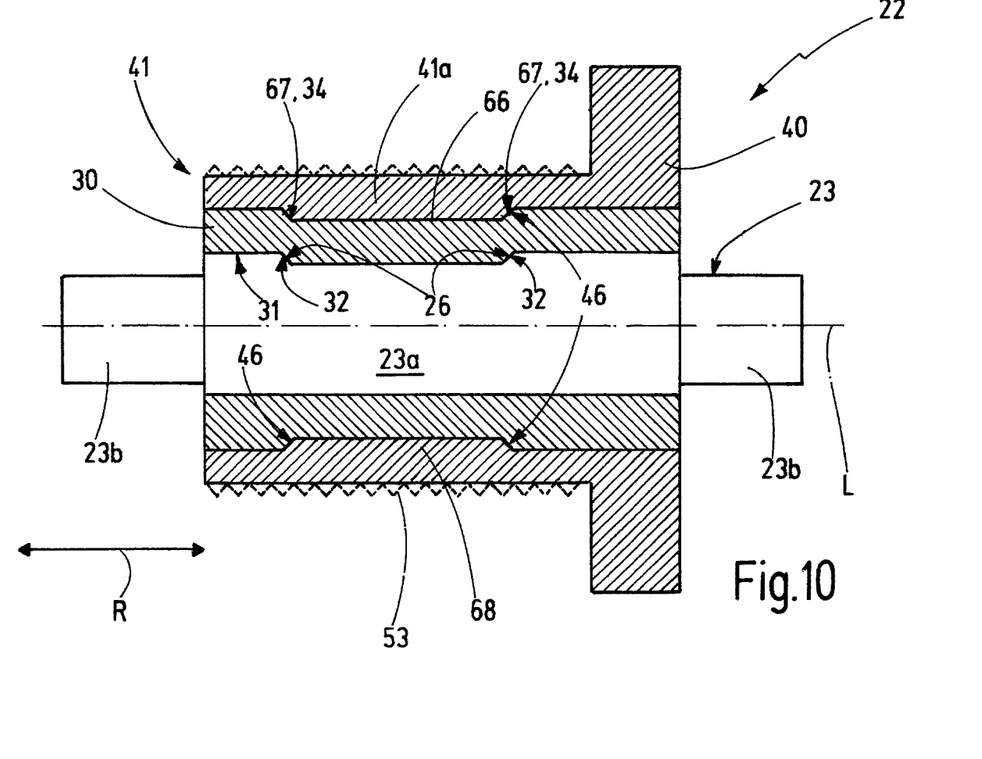
FIG. 10 is a longitudinal section of the exemplary embodiment shown in FIG. 9 following the plastic deformation of the connecting portion.

An alternative embodiment of the explosion-proof assembly 22 is depicted in FIGS. 9 and 10. In this exemplary embodiment the stud has a central portion 23a with a cylindrical contour, which is tapered in a region by a circumferential groove 63. The diameter of the central portion 23a in the region of the circumferential groove 63 is thus reduced. The two groove flanks 64 of this circumferential groove 63 each form a first stop surface 32.

The sleeve 30 is hollow-cylindrical in this exemplary embodiment. The passage surface 45 of the connecting body 40 is in the form of a cylinder lateral surface correspondingly to the sleeve outer surface 33.

The reinforced region 41a of the connecting portion 41 with greater thickness can be increased at the point at which the connecting portion 41 surrounds the circumferential groove 63 in the stud 23. The reinforced region 41a can be thicker than the adjacent hollow-cylindrical connecting portion 41 by an amount corresponding to the depth of the circumferential groove 63.

Similarly to the above-described exemplary embodiments, a deformation force F can act on the connecting portion 41 in order to plastically deform the connecting portion 41 so that said connecting portion presses radially inwardly against the sleeve 30. In so doing, the sleeve 30 deforms and is pressed radially inwardly into the circumferential groove 63 of the stud 23. First counter stop surfaces 32, which each rest against an associated first stop surface 26, these being formed by the groove flanks 64, are created on the sleeve inner surface as a result of this deformation. Equally, a circumferential indentation 65, which has an indentation flank 67 at each of its axial ends provided in the longitudinal direction R, which indentation flanks each form a second stop surface 34, is created in the region of the sleeve outer surface 33. A radial protrusion 68 of the connecting portion 41 created during the plastic deformation protrudes into this circumferential indentation 66 and rests against the indentation flanks 67 and forms second counter stop surfaces 46 each associated with one of the second stop surfaces 34 respectively.

In the exemplary embodiment according to FIGS. 9 and 10 the at least one second stop surface 34 and the at least one second counter stop surface 46 are produced by the plastic deformation of the connecting portion 41. The at least one first counter stop surface 32 is also produced by the plastic deformation of the connecting portion 41. Only the at least one first stop surface 26 on the stud 23 is already provided prior to the plastic deformation of the connecting portion 41. Otherwise, reference can be made to the description further above.

From the foregoing, it can be seen that an explosion-proof assembly 22 is provided that comprises an electrically conductive stud 23 made of a rigid material which is not deformable radially. The stud 23 is coaxially surrounded in a central portion 23a by an electrically insulating sleeve 30. The sleeve 30 is in turn coaxially surrounded by a connecting portion 41 of a connecting body 40. The connecting body 40 is made of plastically deformable material. The sleeve 30 is elastically deformable. Plastic deformation of the connecting portion 41 reduces the outer dimension thereof, and it presses inwardly against the sleeve 30, which is supported on the stud 23. A frictionally engaged and optionally additionally form-fitting connection is thus achieved, which forms a structural unit formed of the connecting body 40, the sleeve 30 and the stud 23. Once the structural unit has been produced, a first stop surface 26 provided on the stud 23 at an incline or radially to the longitudinal axis L of the stud 23 rests against a correspondingly associated first counter stop surface of the sleeve 30. In addition, a second stop surface can be provided on the sleeve 30, which second stop surface is oriented at an incline or radially to the longitudinal axis L, with an associated second counter stop surface 46 of the connecting body 40 resting on said second stop surface. The structural unit can be secured against undesirable relative movements in the longitudinal direction R parallel to the longitudinal axis L by means of the stop surfaces and counter stop surfaces. The structural unit is free from an ignition transmission gap and can be produced easily and quickly without an integrally bonded adhesive connection.

LIST OF REFERENCE SIGNS 20 housing
21 wall
22 explosion-proof assembly
23 stud
23a central portion of the stud
23b end portion of the stud
24 bushing opening
25 stud circumferential surface
25a first circumferential surface portion
25b second circumferential surface portion
25c third circumferential surface portion
26 first stop surface
30 sleeve
31 sleeve inner surface
31a first inner surface portion
31b second inner surface portion
31c third inner surface portion
32 first counter stop surface
33 sleeve outer surface
33a first outer surface portion
33b second outer surface portion
33c third outer surface portion
33d fourth outer surface portion
33e fifth outer surface portion
34 second stop surface
40 connecting body
41 connecting portion of the connecting body
41a reinforced region of the connecting portion
42 flange portion of the connecting body
43 annular flange
44 passage
45 passage surface
45a first passage surface portion
45b second passage surface portion
45c third passage surface portion
46 second counter stop surface
50 annular gap
51 rolling tool
52 portion outer surface
53 outer thread
54 first delimiting surface
55 bushing surface 56 second delimiting surface
57 inner thread
58 Ex gap
62 surface profiling
63 circumferential groove
64 groove flank
66 circumferential indentation
67 indentation flanks
68 radial protrusion
D axis of rotation
F deformation force
L longitudinal axis
R longitudinal direction

The invention claimed is:

1. An explosion-proof housing (20) comprising:
a wall structure that defines a flame-proof encapsulated area
an explosion-proof assembly (22) mounted within and extending through a wall (21) of said wall structure free of a flame ignition transmission gap between said explosion-proof assembly (22) and said wall (21),
said explosion-proof assembly including a non-deformable rigid electrically conductive stud (23) extending along a longitudinal axis (L) having a circumferential surface (25) extending around the longitudinal axis (L) and including a plurality of circumferential surface portions (25a, 25b, 25c), at least one of said circumferential surface portions (25c) forming a non-deformable rigid first stop surface (26) extending at an incline to the longitudinal axis (L),
an electrical insulating sleeve (30) made of an elastically deformable material having a sleeve inner surface (31) with a plurality of inner surface portions (31a, 31b, 31c), said sleeve inner surface (31) extending around the longitudinal axis (L) and resting against the circumferential surface (25) of the non-deformable rigid stud (23), at least one of the inner surface portions (31c) of the insulating sleeve (30) forming a first counter stop surface (32) which extends at an incline to the longitudinal axis (L) and which rests against said first non-deformable rigid stop surface (26),
a connecting body (40) surrounding at least one portion of the length of the sleeve (30) made of a plastically deformable material and having a plastically deformed connecting portion (41) pressing radially inwardly against the sleeve (30) for forming a frictionally engaged connection between the connecting body (40) and the sleeve (30) and between the sleeve (30) and the non-deformable rigid stud (23), and
said electrically conductive non-deformable rigid stud (23) being non-deformable under deformation forces on said connecting body (40) for pressing the connecting body (40) against the sleeve (30) for forming a frictionally engaged connection between the connecting body (40) and the sleeve (30) and between the sleeve (30) and non-deformable rigid stud (23) free of flame ignition transmission gaps.

2. The explosion-proof housing (20) of claim 1 in which said one first counter non-deformable rigid stop surface (32) is provided prior to the plastic deformation of the connecting portion (41).

3. The explosion-proof housing (20) of claim 1 in which said at least one first non-deformable rigid stop surface (26) is provided on an annular step of the non-deformable rigid stud (23).

4. The explosion-proof housing (20) of claim 1 in which said sleeve (30) has a sleeve outer surface (33) which rests against a passage surface (45) defined by a passage (44) extending through the connecting body (40) in the longitudinal direction (L).

5. The explosion-proof housing (20) of claim 4 in which said sleeve outer surface (33) has a plurality of outer surface portions (33a, 33b, 33c, 33d, 33e), and at least one of the outer surface portions (33d, 33e) forms a second stop surface (34) extending at an incline to the longitudinal axis (L).

6. The explosion-proof housing (20) of claim 5 in which said passage surface (45) has a plurality of passage surface portions (45a, 45b, 45c), and at least one of said passage surface portions (45c) forms a second counter stop surface (46) which extends at an incline to the longitudinal axis (L) and which rests against said second stop surface (34) of said sleeve.

7. The explosion-proof housing (20) of claim 6 in which at least one of said second stop surface (34) of said sleeve and second counter stop surface (46) of said passage surface (45) is provided prior to the plastic deformation of the connecting portion (41).

\* \* \* \* \*